2,936,318
Patented May 10, 1960

2,936,318

FISSION PRODUCT REMOVAL FROM ORGANIC SOLUTIONS

Raymond H. Moore, Richland, Wash., assignor to the United States of America as represented by the United States Atomic Energy Commission No Drawing. Application November 24, 1958
Serial No. 776,153

13 Claims. (Cl. 260—461)

This invention deals with the decontamination of organic solvents from fission products and in particular with the treatment of solvents that had been used for the extraction of uranium and/or plutonium from aqueous acid solutions of neutron-irradiated uranium.

In extraction processes the uranium and/or plutonium values are usually first extracted into a water-immiscible organic solvent and then recovered therefrom by back-extraction with an aqueous medium. The fission products in most instances remain in the aqueous solution; in other words, they are not taken up to a considerable degree by the organic solvent. However, no extraction process accomplishes a quantitative separation and some of the fission product values are extracted into the organic solvent and retained therein during back-extraction with the aqueous medium. Since the organic solvent is usually recycled for obvious economical reasons, it becomes more enriched in fission products with each cycle. Eventually the fission product content becomes so high that the efficiency of the solvent is impaired; also the high fission product content represents a hazard on account of the gamma radiation emitted by them.

It is an object of this invention to provide a simple process for the removal of fission products from organic solvents.

It is another object of this invention to provide a process for the removal of fission products from organic solvents whereby the solvent is regenerated so that it can be used again immediately for extraction.

Manganese dioxide has a great affinity for fission products and is therefore ideally suitable for removing fission products from the organic solutions described above. This function as a so-called scavenger is possibly due to adsorption, but the type of reaction which is responsible for the scavenging effect is not known with certainty.

It has now been found that manganese dioxide that has been prepared from manganese carbonate by heating at from 300 to 500° C. has an increased affinity for the fission products and therefore is more efficient than manganese dioxide prepared by other more conventional processes.

It was also found that the carrying or scavenging effect of manganese dioxide prepared from manganese carbonate can still be furthermore improved by "alkalizing" the organic solution to be treated. The steps which accomplish this alkalizing effect will be described in detail later in this specification.

Finally it was also found that, in the case of tributyl phosphate being the solvent, the manganese dioxide has a dual function. It not only removes the fission products from the tributyl phosphate, but it also "adsorbs" the dibutyl phosphate that is usually formed as an undesirable side product in the extraction with tributyl phosphate from acid solutions. For many extraction processes the tributyl phosphate has to be pretreated by washing it with an aqueous sodium carbonate or sodium hydroxide solution to remove the dibutyl phosphate, because the latter exerts a complexing action on many metals, for instance on uranium and thorium. This pretreatment with the alkaline solutions is unnecessary in the process of this invention, because the manganese dioxide accomplishes the same result.

The process of this invention thus broadly comprises heating manganese carbonate in air to a temperature of between 300 and 500° C. whereby manganese dioxide is formed; mixing the manganese dioxide with the fission product-containing organic solvent to be treated whereby the fission product values are precipitated on the manganese dioxide; and separating the fission product-containing manganese dioxide from the solvent.

While a temperature range of from 300 to 500° C. is operative for the calcination of the manganese carbonate, the range of from 300 to 400° C. is preferred. It was found that the manganese dioxide prepared at the lower temperature has a larger surface area. For instance, using the B.E.T. method (which is a method deviced by Brunauer, Emmett and Teller described, for instance, in "A Treatise on Physical Chemistry" by Taylor and Glasstone, vol. II, pages 602–605, Van Nostrand; second printing), it was ascertained that manganese dioxide produced by calcining at 350° C. had a surface area of 134.2 square meters, while that produced at 500° C. had a surface area of 54.2 square meters/gram only. However, either product was suitable for removing fission products. A heating time of from 30 to 60 minutes was usually sufficient.

The alkalization of the solvent mentioned above can be either carried out as a pretreatment with a sodium carbonate solution, for instance of from 3 to 5%, or with a sodium hydroxide solution, for instance of from 5 to 10%; however, the preferred method of alkalizing is by adding solid calcium oxide to the solvent before or together with the manganese dioxide. The quantity of the calcium oxide may range from 3 to 5 pounds per 100 gallons of solvent.

The effects of various pretreatment procedures, including that with nitric acid, are shown in Tables I and II. In all instances the solvents were tributyl phosphate ("TBP"). The manganese dioxide for the experiments of Table I had been prepared from manganese carbonate by calcining at a temperature of 350° C. In the experiments of both tables, 12 grams of manganese dioxide were used per liter of solution and a temperature of 25° C. Contact was maintained for one hour. In Table I washing was carried out with two portions of the pretreatment reagent, each portion having the same volume as that of the organic solution.

Table I

| Solution, c./m./ml. | Pretreatment Reagent | Pretreatment DF | Scav. DF Total | Overall DF | Final, c./m./ml. |
|---|---|---|---|---|---|
| 4,685 | 1.0 M HNO₃ | 2.05 | 1.13 | 2.3 | 2,100 |
| 4,685 | 0.25 M Na₂CO₃ | 2.9 | 1.9 | 5.5 | 869 |
| 4,685 | 10% NaOH | 9.8 | 13.1 | 128 | 32 |
| 4,685 | 20% NaOH | 3.5 | 13.2 | 46.2 | 87 |
| 4,663 | 1.0 M HNO₃ | 1.8 | 1.6 | 2.9 | 1,610 |
| 4,663 | 0.25 M Na₂CO₃ | 4.9 | 2.7 | 13.2 | 351 |
| 27,300 | 0.25 M Na₂CO₃ | 2.7 | 140.3 | 378 | 72 |
| 27,300 | 10% NaOH | 17.3 | 461 | 7,980 | 35 |

It will be obvious from Table I that nitric acid is not a satisfactory pretreating reagent and that the manganese dioxide actually has to be "alkalized." In fact, nitric acid impairs the decontaminating effect of the manganese dioxide, and the decontamination factor obtained after nitric acid treatment is lower than that obtained with the untreated manganese dioxide.

Table II

| Scavenging Treatment | Dibutyl Phosphate, p.p.m. | Total $\gamma$ c./m./ml. | DF |
|---|---|---|---|
| None | 100–200 | 3,348 | None |
| 12 g./l. MnO$_2$*+4 g./l. CaO | 0–10 | 215 | 15.6 |
| 12 g./l. MnO$_2$* only | 0–10 | 885 | 3.8 |
| 12 g./l. MnO$_2$*+4 g./l. CaO | 0–10 | 223 | 15.0 |
| 12 g./l. MnO$_2$** only | 10–20 | 1,165 | 2.8 |

*MnO$_2$ prepared by calcination at 350° C.
**MnO$_2$ prepared by calcination at 500° C.

Table II shows that the decontamination factor ("DF"=c./m./ml. in feed:c./m./ml. in treated solution) of the manganese dioxide is improved four- to fivefold by treatment with solid calcium oxide. This is not as good as the improvement obtained with the alkaline solutions; however, the calcium oxide method has the advantage that it does not require any additional steps, because it can be added together with the manganese dioxide and separation of an aqueous from an organic phase is not necessary.

Table II also illustrates the removal of dibutyl phosphate. While the dibutyl phosphate in the original solutions ranged from 100 to 200 p.p.m., its content was reduced to almost zero in three runs and to between 10 and 20 p.p.m. in the fourth run.

The quantity of manganese dioxide can vary widely. The efficiency of the process, however, increases with increasing amounts of manganese dioxide, the rate of increase slowing down abruptly above a quantity of about 4 grams of manganese dioxide per liter of solution, which corresponds to about 3.3 pounds of manganese dioxide per 100 gallons. This effect of quantity of manganese dioxide is obvious from data compiled in Table III. The manganese dioxide used there had been prepared by calcination of manganese carbonate at 350° C. Scavenging was carried out in these runs at a temperature of 50° C., and contact between the manganese dioxide and the organic solution was maintained for 30 minutes.

Table III

| Alkalizing Procedure of TBP Solution | Total $\gamma$/m./ml. | Zr-Nb, $\gamma$/m./ml. | Ru-Rh, $\gamma$/m./ml. | I$^{131}$, $\gamma$/m./ml. | Wt. MnO$_2$, g./l. |
|---|---|---|---|---|---|
| 2 equal vol. 3% Na$_2$CO$_3$ Washes | 1,008 | 1.6×10$^4$ | 2.4×10$^3$ | None | None |
| Do | 579 | 1.5×10$^4$ | 2.4×10$^3$ | None | 0.5 |
| Do | 481 | 1.1×10$^4$ | <1.0×10$^3$ | None | 1.0 |
| Do | 343 | 7.5×10$^3$ | <1.0×10$^3$ | None | 2.0 |
| Do | 320 | 6.9×10$^3$ | <1.0×10$^3$ | None | 4.0 |
| Do | 292 | 4.9×10$^3$ | <1.0×10$^3$ | None | 12.0 |
| 2 equal vol. 10% NaOH Washes | 351 | 7.5×10$^3$ | 2.4×10$^3$ | None | None |
| Do | 143 | 3.8×10$^3$ | 9.7×10$^2$ | None | 0.5 |
| Do | 109 | 1.9×10$^3$ | 7.3×10$^2$ | None | 1.0 |
| Do | 76 | 3.1×10$^3$ | 9.8×10$^2$ | None | 2.0 |
| Do | 55 | <1.0×10$^3$ | <1.0×10$^2$ | None | 4.0 |
| 2 equal vol. 3% Na$_2$CO$_3$ Washes | 5,251 | 5.1×10$^3$ | 1.5×10$^4$ | 2.0×10$^4$ | None |
| Do | 3,038 | 1.6×10$^4$ | 3.4×10$^3$ | 1.9×10$^4$ | 1.0 |
| Do | 2,909 | 1.1×10$^4$ | 3.7×10$^3$ | 2.2×10$^4$ | 2.0 |
| Do | 2,775 | 6.9×10$^3$ | 3.7×10$^3$ | 2.2×10$^4$ | 4.0 |
| 2 equal vol. 10% NaOH Washes | 3,206 | 1.2×10$^4$ | 8.0×10$^3$ | 1.6×10$^4$ | None |
| Do | 2,259 | <1.0×10$^3$ | 3.3×10$^3$ | 1.9×10$^4$ | 1.0 |
| Do | 2,175 | <1.0×10$^3$ | 2.2×10$^3$ | 1.5×10$^4$ | 2.0 |
| Do | 2,106 | <1.0×10$^3$ | 3.2×10$^3$ | 2.0×10$^4$ | 4.0 |

From the data of Table III is was deduced that a quantity of from 1 to 3.5 pounds of manganese dioxide per 100 gallons of solution represented the optimal conditions.

The process can be carried out at room temperature, as has been shown; however, improved results were obtained at a temperature between 50 and 70° C. The effect of elevated temperature is shown in the experiments summarized in Table IV. In these experiments 12 grams of manganese dioxide (calcination temperature 350° C.) were used per liter of solution. The organic solutions had been washed twice with two equal volumes of a 3% sodium carbonate solution. The over-all decontamination factors include the effect of this washing treatment.

Table IV

| TBP-solution, c./m./ml. | Temp., °C. | Scav. DF, Total $\gamma$ | Scav. DF, Zr-Nb | Scav. DF, Ru-Rh | Over-all DF, Total $\gamma$ |
|---|---|---|---|---|---|
| 4,685 | 25 | 1.9 | (²) | (²) | 5.4 |
| 4,685 | 50 | 3.5 | 3.3 | (²) | 11.9 |
| 4,685 | 70 | 3.8 | 4.1 | ≃4 | 11.0 |
| 4,663 | 25 | 2.7 | (²) | (²) | 13.3 |
| 4,663 | 70 | 7.2 | 9.2 | ≃4 | 34.8 |
| | 25 | ¹2.2 | (²) | 2.0 | ¹21.6 |
| | 70 | ¹3.7 | >100 | 4.5 | ¹37.1 |
| | 110 | ¹4.9 | >100 | 8.9 | ¹48.9 |

¹ Presence of I$^{131}$ not removed by scavenging precludes direct comparison of these numbers with those above.
² Was not determined.

After the treatment of the organic solution with the manganese dioxide, which then contains the fission product values, the manganese dioxide is removed from the solution by any known methods, for instance by centrifugation, filtration or decantation, or any combination of these means.

The process does not require any specific equipment. Any device known to those skilled in the art is suitable. The use of a mixing device is especially advantageous to intensify contact between the solid manganese dioxide and the organic solution. The process can be carried out in a continuous manner or as a batch process.

It will be understood that this invention is not to be limited to the details given herein, but that it may be modified within the scope of the appended claims.

What is claimed is:

1. A process of removing fission product values from an organic extraction solvent, comprising calcining manganese carbonate in air at from 300 to 500° C. whereby manganese dioxide is formed; alkalizing the organic solvent; mixing the manganese dioxide with the solvent whereby the fission products are carried on said manganese dioxide; and separating the fission-product-containing manganese dioxide from the depleted solvent.

2. The process of claim 1 wherein the solvent is tributyl phosphate.

3. The process of claim 1 wherein the calcination temperature ranges between 300 and 400° C.

4. The process of claim 1 wherein manganese dioxide is admixed in a quantity of from 1 to 3.5 pounds per 100 gallons of organic solution.

5. The process of claim 1 wherein mixing is carried out at a temperature of between 50 and 70° C.

6. The process of claim 1 wherein alkalizing is carried out by contact with an aqueous sodium carbonate solution.

7. The process of claim 6 wherein the sodium carbonate solution has a concentration of between 3 and 5%.

8. The process of claim 1 wherein alkalizing is carried out by contacting with an aqueous sodium hydroxide solution.

9. The process of claim 8 wherein the concentration of the sodium hydroxide solution ranges between 5 and 10%.

10. The process of claim 1 wherein alkalizing is carried out by the addition of solid calcium oxide to the organic solvent.

11. The process of claim 10 wherein the calcium oxide is added in a quantity of from 3 to 5 pounds per 100 gallons of solvent.

12. The process of claim 10 wherein the calcium oxide is added to the organic solvent simultaneously with the manganese dioxide.

13. A process of removing fission product values from a solution in dibutyl-phosphate-containing tributyl phosphate, comprising calcining manganese carbonate in air at from 300 to 400° C. whereby manganese dioxide is formed; heating the tributyl phosphate solution to a temperature of between 50 and 70° C.; adding from 1 to 3.5 pounds of said manganese dioxide and from 3 to 5 pounds of solid calcium oxide each per 100 gallons of tributyl phosphate solution, whereby dibutyl phosphate and fission product values are taken up by the manganese dioxide; and separating said manganese dioxide from the tributyl phosphate solution.

References Cited in the file of this patent

UNITED STATES PATENTS

| | | |
|---|---|---|
| 2,608,466 | Fox | Aug. 26, 1952 |
| 2,717,696 | Schubert | Sept. 13, 1955 |
| 2,847,278 | Wilson | Aug. 12, 1958 |